US012683267B2

(12) United States Patent
Jargalsaikhan et al.

(10) Patent No.: US 12,683,267 B2
(45) Date of Patent: Jul. 14, 2026

(54) MULTI-BAND BASE STATION ANTENNA USING SELECTIVE SHIELDING SURFACE

(71) Applicant: ACE TECHNOLOGIES CORPORATION, Incheon (KR)

(72) Inventors: Nyambayar Jargalsaikhan, Incheon (KR); Jeong Geun Park, Daejeon (KR); Ho-Yong Kim, Incheon (KR); Iinar Battlov, Incheon (KR); Min Seok Jung, Incheon (KR)

(73) Assignee: ACE TECHNOLOGIES CORPORATIO, Incheon (KR)

( * ) Notice: Subject to any disclaimer, the term of this patent is extended or adjusted under 35 U.S.C. 154(b) by 19 days.

(21) Appl. No.: 18/742,771

(22) Filed: Jun. 13, 2024

(65) Prior Publication Data

US 2024/0332796 A1 Oct. 3, 2024

Related U.S. Application Data

(63) Continuation of application No. PCT/KR2022/015977, filed on Oct. 19, 2022.

(30) Foreign Application Priority Data

Dec. 16, 2021 (KR) ........................ 10-2021-0180595

(51) Int. Cl.
*H01Q 1/24* (2006.01)
*H01Q 5/42* (2015.01)
(Continued)

(52) U.S. Cl.
CPC ............... *H01Q 1/246* (2013.01); *H01Q 5/42* (2015.01); *H01Q 15/0013* (2013.01); *H01Q 19/108* (2013.01); *H01Q 21/26* (2013.01)

(58) Field of Classification Search
CPC ............ H01Q 1/246; H01Q 5/40; H01Q 5/42; H01Q 5/48; H01Q 15/0013; H01Q 15/14;
(Continued)

(56) References Cited

U.S. PATENT DOCUMENTS

2018/0269577 A1* 9/2018 Kosaka .................... H01Q 5/48
2018/0331419 A1 11/2018 Varnoosfaderani et al.
(Continued)

FOREIGN PATENT DOCUMENTS

KR 10-2017-0052103 A 5/2017
KR 10-2019-0086130 A 7/2019
(Continued)

OTHER PUBLICATIONS

International Search Report issued from PCT International Application No. PCT/KR2022/017742 issued on Apr. 10, 2023.
(Continued)

*Primary Examiner* — Robert Karacsony

(57) ABSTRACT

Disclosed is a multi-band base station antenna using a selective shielding surface. The disclosed antenna comprises: a selective shielding surface which passes signals in a preset frequency band; a plurality of low-band radiators located on the selective shielding surface; a reflection plate disposed below the selective shielding surface and spaced apart from the selective shielding surface; and a plurality of high-band radiators coupled onto the reflection plate, wherein the selective shielding surface has a pass band configured to pass signals emitted from the high-band radiators and block signals emitted from the low-band radiators.

9 Claims, 14 Drawing Sheets

(51) Int. Cl.
*H01Q 15/00* (2006.01)
*H01Q 19/10* (2006.01)
*H01Q 21/26* (2006.01)

(58) Field of Classification Search
CPC ...... H01Q 19/108; H01Q 21/26; H01Q 21/28; H01Q 25/001; H01Q 25/002
See application file for complete search history.

(56) References Cited

U.S. PATENT DOCUMENTS

2023/0335903 A1* 10/2023 Jing .................. H01Q 15/0053
2024/0186711 A1* 6/2024 Li ........................... H01Q 5/45

FOREIGN PATENT DOCUMENTS

KR 10-2020-0129884 A 11/2020
WO 2020-239190 A1 12/2020

OTHER PUBLICATIONS

Written Opinion of the International Searching Authoriity of PCT/KR2022/017742 issued on Apr. 10, 2023.

* cited by examiner

MULTI-BAND BASE STATION ANTENNA USING SELECTIVE SHIELDING SURFACE

CROSS-REFERENCE TO RELATED APPLICATIONS

This application is a bypass continuation of PCT International Application No. PCT/KR2022/015977, which was filed on Oct. 19, 2022, and which claims priority from Korean Patent Application No. 10-2021-0180595 filed on Dec. 16, 2021. The entire contents of the aforementioned patent applications are incorporated herein by reference.

BACKGROUND

1. Technical Field

The present disclosure relates to a multi-band base station antenna, and more particularly, to a multi-band base station antenna using a selective shielding surface.

2. Description of the Related Art

Currently, installation and demand for 5G communication systems are rapidly increasing, and methods for efficient use with existing LTE communication networks are being considered. The reason why this technology is being considered is because it costs a lot of money to install a new base station to operate the 5G communication system, and when installing an additional 5G communication system in the base station of an existing communication system, there is a problem that the quality of communication service deteriorates due to interference between systems.

In order to operate efficient communication networks, technology is essential to enable existing antennas to operate in multiple bands and to miniaturize the size of the antenna. This technology is already being actively researched in the domestic and foreign antenna industry, but there are difficulties in securing stable antenna performance in multiple bands and miniaturizing the antenna.

To miniaturize the base station antenna, multiple radiators must be placed in a limited space, and to implement multi-band characteristics, antennas covering 698~960 MHz, 1427~2690 MHz, and 5G communication system bands (sub-6G, 3 GHz frequency band) must be arranged appropriately for the frequency used.

FIG. 1 is a diagram showing the radiator array structure of a conventional 5G multi-band base station antenna.

Referring to FIG. 1, a conventional 5G multi-band base station antenna includes a plurality of low-band radiators 100 and a plurality of high-band radiators 110. The low-band radiators 100 and the high-band radiators 110 are disposed while sharing the same reflection plate (not shown), and this arrangement inevitably causes interference between the high-band radiators and the low-band radiators.

SUMMARY OF THE INVENTION

An object of the present disclosure is to propose a multi-band base station antenna that can efficiently suppress interference between high-band radiators and low-band radiators.

Another object of the present disclosure is to propose a multi-band base station antenna that can suppress interference between radiators of different bands by using a selective shielding surface in a 5G multi-band base station antenna in which beam forming is performed at various angles.

According to one aspect of the present disclosure to achieve the above-mentioned objects, a multi-band base station antenna using a selective shielding surface is provided, the antenna comprising: a selective shielding surface which passes signals in a preset frequency band; a plurality of low-band radiators located on the selective shielding surface; a reflection plate disposed below the selective shielding surface and spaced apart from the selective shielding surface; a plurality of high-band radiators coupled onto the reflection plate, wherein the selective shielding surface has a pass band configured to pass signals emitted from the high-band radiators and block signals emitted from the low-band radiators.

The selective shielding surface may have a structure in which unit cells are repeatedly arranged.

The unit cell may include a plurality of sub-cells, and the plurality of sub-cells included in the one unit cell may have a symmetrical relationship or have the same shape.

Each of the plurality of sub-cells may include a plurality of spiral arms.

A spiral arm of a specific sub-cell may be connected to a spiral arm of another adjacent sub-cell.

The number of spiral arms in each of the plurality of sub-cells may correspond to the number of vertices of a polygon corresponding to the shape of the sub-cell.

The multi-band base station antenna using a selective shielding surface, wherein vertical selective shielding surfaces perpendicular to the selective shielding surface are coupled to both sides of the selective shielding surface, and the vertical selective shielding surfaces have a pass band configured to pass signals emitted from the high-band radiators and block signals emitted from the low-band radiators According to another aspect of the present disclosure, a multi-band base station antenna using a selective shielding surface is provided, the antenna comprising: a selective shielding surface which passes signals in a preset frequency band; and a plurality of first radiators located on the selective shielding surface, wherein the selective shielding surface has a pass band configured to block the radiation signal of the first radiators, the selective shielding surface has a structure in which unit cells are repeatedly arranged, the unit cell includes a plurality of sub-cells, and the plurality of sub-cells included in the one unit cell have a mutually symmetrical relationship or have the same shape.

According to the present disclosure, there is an advantage in that interference between high-band radiators and low-band radiators can be effectively suppressed by using the selective shielding surface in a multi-band base station antenna for 5G where beam-forming is performed at various angles.

DETAILED DESCRIPTION OF THE INVENTION

Figure 1:
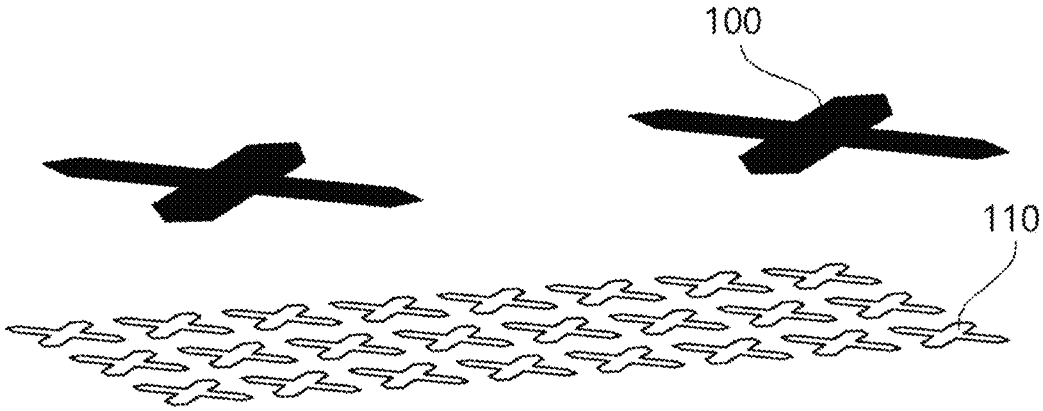
FIG. 1 is a diagram showing the radiator array structure of a conventional 5G multi-band base station antenna.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
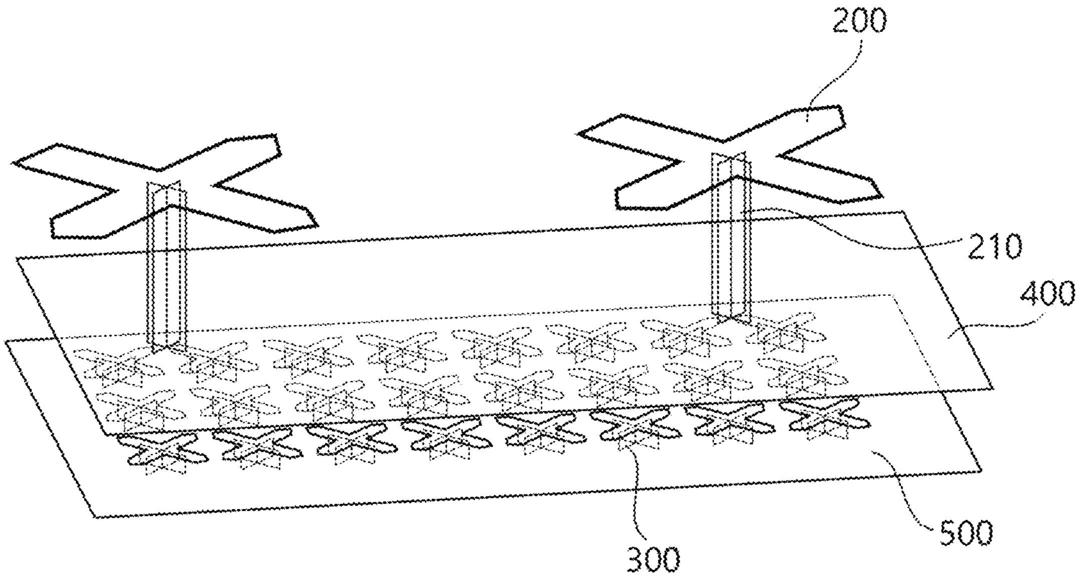
FIG. 2 is a perspective view of a multi-band base station antenna using a selective shielding surface according to an embodiment of the present disclosure.
Figure 3:
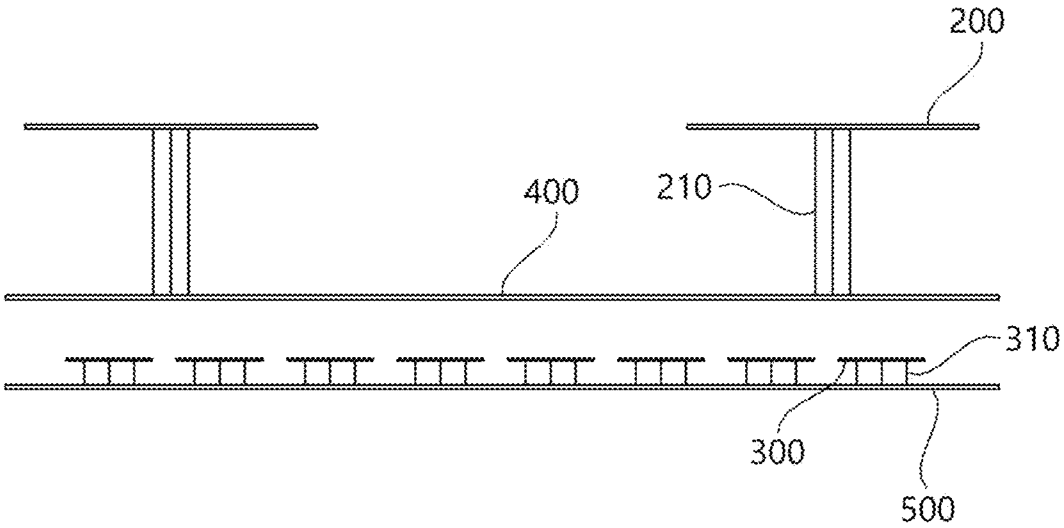
FIG. 3 is a cross-sectional view of a multi-band base station antenna using a selective shielding surface according to an embodiment of the present disclosure.

FIG. 2 is a perspective view of a multi-band base station antenna using a selective shielding surface according to an embodiment of the present disclosure, and FIG. 3 is a cross-sectional view of a multi-band base station antenna using a selective shielding surface according to an embodiment of the present disclosure.

Referring to FIGS. 2 and 3, a multi-band base station antenna according to an embodiment of the present disclosure may include a plurality of low-band radiators 200, a plurality of high-band radiators 300, a selective shielding surface 400, and a reflection plate 500.

The plurality of low-band radiators 200 are radiators configured to transmit and receive low-band signals. Since the size of the radiator is inversely proportional to the frequency band it emits, the low-band radiator 200 has a larger size than the high-band radiator. The plurality of low-band radiators 200 may be fixed to the upper part of the selective shielding surface 400, and specifically, a low-band balun 210 for impedance matching and feeding to the low-band radiator 200 may be fixed to the upper part of the selective shielding surface 400.

According to one embodiment of the present disclosure, the low-band radiator 200 may be a radiator configured to emit dual polarized signals of +45 degree polarization and −45 degree polarization, and, for example, may emit a band of 1 GHz or less.

The selective shielding surface 400 functions to selectively pass or block RF signals depending on the frequency. Specifically, the selective shielding surface 400 operates to pass signals in a preset frequency band and block signals of frequencies other than the corresponding frequency band. The pass band of the selective shielding surface 400 is set to pass the radiation signal of the high-band radiators 300 and to block the radiation signal of the low-band radiators 200.

Since the selective shielding surface 400 operates to block radiation signals of the low-band radiators 200, the selective shielding surface 400 functions as a reflection plate from the perspective of the low-band radiators 200. Since the selective shielding surface 400 functions as a reflection plate in terms of low-band frequency, signals emitted from the low-band radiators 200 are reflected from the selective shielding surface 400, and as a result, the signals emitted from the low-band radiators 200 are directed upwards of the selective shielding surface 400.

Meanwhile, a plurality of high-band radiators 300 are arranged below the selective shielding surface 400 and spaced apart from the selective shielding surface 400. The high-band radiators 300 are radiators configured to transmit and receive high-band signals. Since the size of the radiator is inversely proportional to the frequency band it emits, the high-band radiator 300 has a smaller size than the low-band radiator. Since high-band signals often require higher gain than low-band signals, the number of high-band radiators 300 is generally greater than that of low-band radiators 200. However, the number of high-band radiators 300 is not limited to the examples shown in FIGS. 2 and 3 and may be set in various ways depending on required characteristics.

According to one embodiment of the present disclosure, the high-band radiator 300 may be a radiator configured to emit dual polarized signals of +45 degree polarization and −45 degree polarization, and, for example, may emit a band of 1 GHz or more.

A reflection plate 500 is located below the plurality of high-band radiators 300, and the plurality of high-band radiators 300 are fixed to the upper part of the reflection plate 500. The balun 310 of the high-band radiator is fixed to the upper part of the reflection plate 500.

According to a preferred embodiment of the present disclosure, the pass band of the selective shielding surface is configured to pass signals emitted from the high-band radiators 300.

Since the selective shielding surface 400 passes signals emitted from the high-band radiators 300, the selective shielding surface 400 does not function as a shielding face or reflection plate from the perspective of the high-band radiators 300, and signals emitted from the high-band radiators 300 pass through the selective shielding surface 400, which means that the selective shielding surface 400 does not affect the radiation pattern of the high-band radiators 300.

Meanwhile, since the reflection plate 500 is located below the high-band radiators 300, signals heading to the reflection plate 500 among signals of the high-band radiators 300 is reflected by the reflection plate 500, and eventually, a radiation pattern is formed such that the signals emitted from the high-band radiators 300 are directed upwards from the reflection plate 500.

When the high-band radiators 300 and the low-band radiators 200 are located adjacent to each other, there are frequent cases where signals from the low-band radiators 200 are transmitted to the high-band radiators 300 and affects radiation signals of the high-band radiators 300, and securing isolation between the high-band radiators 300 and the low-band radiators 200 is a very important characteristic required for a multi-band antenna.

In the present disclosure, by placing the low-band radiators 200 on top of the selective shielding surface 400 and the high-band radiators 300 below the selective shielding surface 400, signals from the low-band radiators 200 are blocked from being transmitted to the high-band radiators 300. This antenna structure of the present disclosure is capable of providing better isolation characteristics compared to existing multi-band antennas, and the radiation pattern of the high-band radiators 300 is not affected by the selective shielding surface 400.

Figure 4:
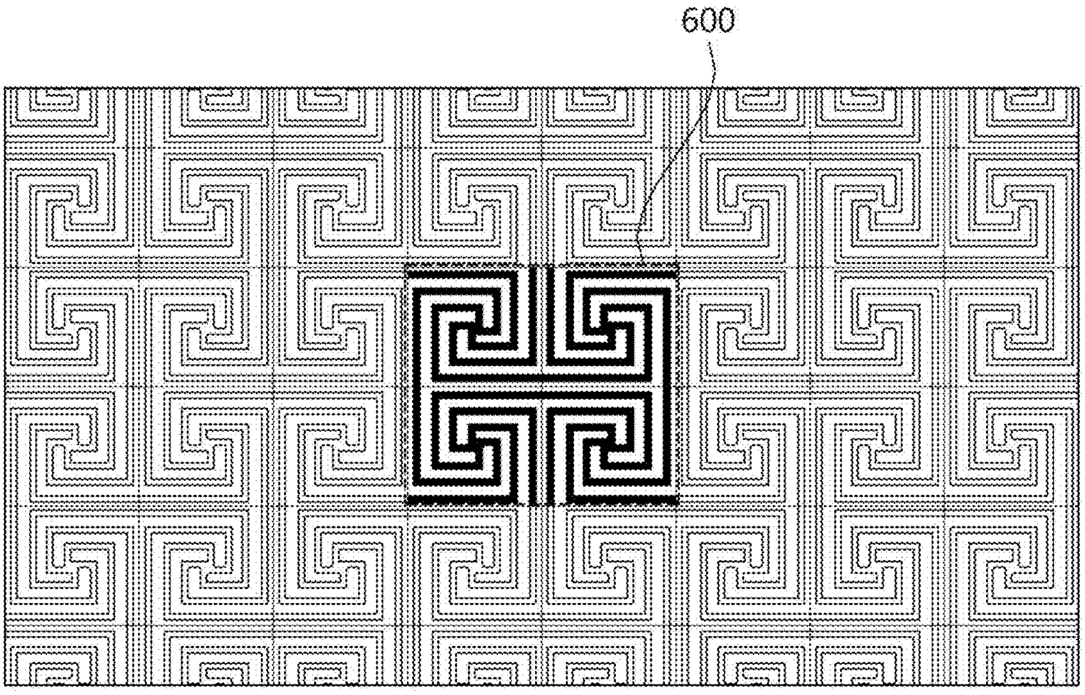
FIG. 4 is a diagram showing the structure of a selective shielding surface according to an embodiment of the present disclosure.
Figure 5:
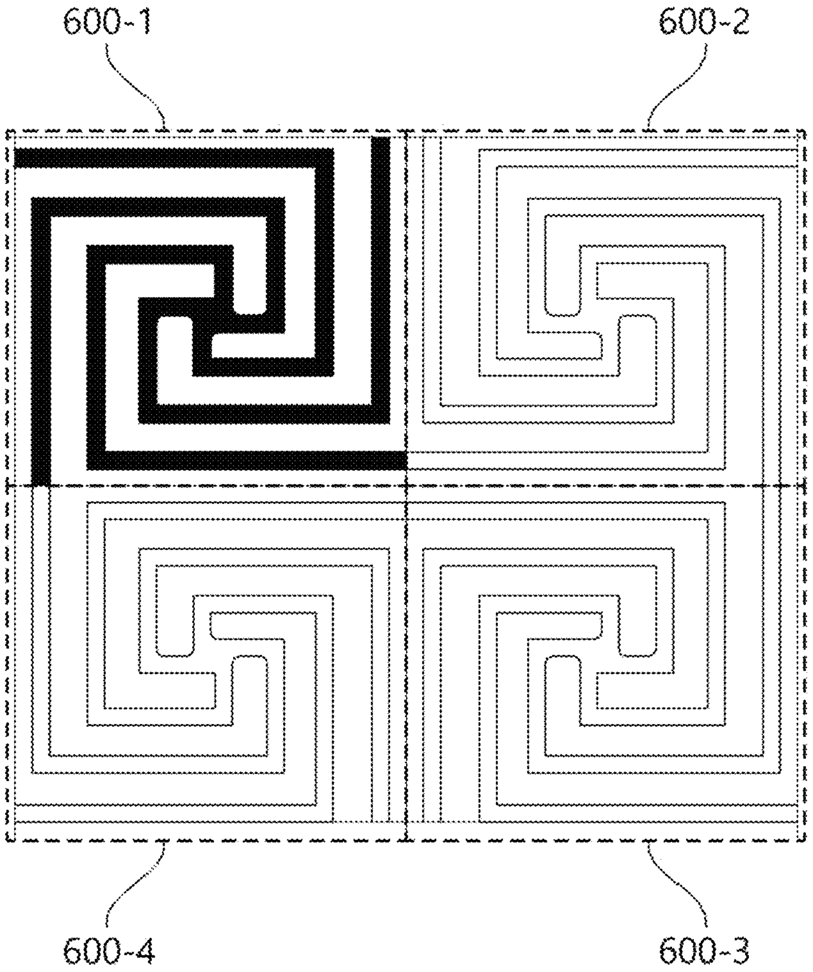
FIG. 5 is a diagram showing the structure of one unit cell on a selective shield surface according to an embodiment of the present disclosure.

FIG. 4 is a diagram showing the structure of a selective shielding surface according to an embodiment of the present disclosure, and FIG. 5 is a diagram showing the structure of one unit cell on a selective shield surface according to an embodiment of the present disclosure.

Referring to FIGS. 4 and 5, a plurality of unit cells are repeatedly formed on the selective shielding surface according to an embodiment of the present disclosure. It can be seen from FIG. 4 that it has a structure in which unit cells 600 as shown in FIG. 5 are repeated.

Selective shielding surfaces that only pass specific frequency bands have been used for purposes such as selective absorption of electromagnetic waves. However, the existing selective shielding surface has never been used to isolate high-band signals and low-band signals like in the present disclosure, and the existing selective shielding surface could not be used as a selectively functioning reflection plate like in the present disclosure.

Signals emitted from the low-band radiators 200 or the high-band radiators 300 arrive at the selective shielding surface 400 at various angles, and the selective shielding surface 400 of the present disclosure needs to achieve the same effect for signals arriving at various angles. For example, it is necessary to maintain the same pass band for signals arriving vertically (0 degrees) and signals arriving at 60 degrees. However, the existing selective shielding surface 400 did not have the same pass band for signals arriving at various angles, and for this reason, it was difficult to use it to isolate high-band signals and low-band signals, and it was difficult to selectively reflect only low-band signals and selectively pass only high-band signals.

In the present disclosure, it has a structure in which unit cells are repeatedly formed to maintain the same pass band for signals arriving from various angles.

Referring to FIG. 5, the unit cell of the selective shielding surface according to an embodiment of the present disclosure may be divided into a plurality of sub-cells 600-1, 600-2, 600-3 and 600-4. FIG. 5 shows an example divided into four sub-cells, but the number of sub-cells can be set appropriately as needed.

The plurality of sub-cells included in the unit cell 600 may have the same shape, and may have a symmetric relationship with each other.

Referring to FIG. 5, the first sub-cell 600-1 and the second sub-cell 600-2 have a left-right symmetrical relationship, the first sub-cell 600-1 and the third sub-cell 600-3 have an origin symmetry relationship, and the first sub-cell 600-1 and the fourth sub-cell 600-4 have a vertically symmetrical relationship. This is to ensure that it has the same pass band characteristics for signals incident at various angles.

Figure 6:
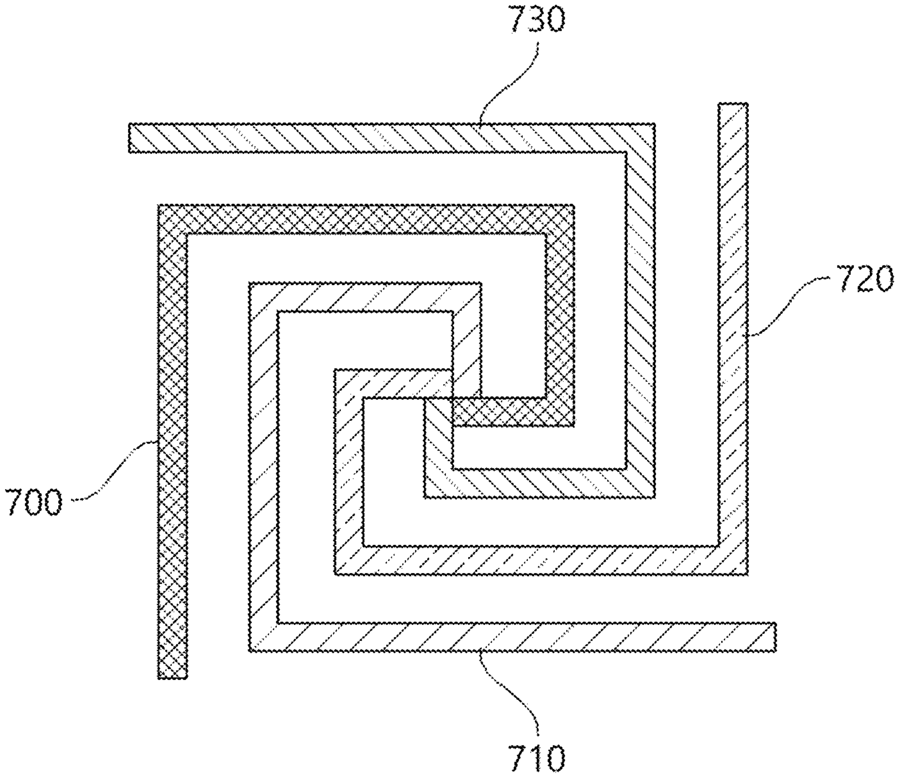
FIG. 6 is a diagram showing the structure of one sub-cell in a selective shielding surface according to an embodiment of the present disclosure.

FIG. 6 is a diagram showing the structure of one sub-cell in a selective shielding surface according to an embodiment of the present disclosure.

Referring to FIG. 6, the sub-cell according to an embodiment of the present disclosure includes a plurality of spiral arms 700, 710, 720, and 730 formed from a central point. The spiral arms 700, 710, 720, and 730 have a structure that extends from a central point and is bent multiple times.

The sub-cell composed of a plurality of spiral arms has an overall polygonal structure, and FIG. 6 shows the sub-cell having an overall rectangular structure.

According to a preferred embodiment of the present disclosure, the spiral arms of each sub-cell are connected to the spiral arms of other adjacent sub-cells. As the spiral arms of sub-cells are connected to the spiral arms of other sub-cells, the selective shielding surface 400 has a structure in which unit cells are repeatedly arranged.

According to a preferred embodiment of the present disclosure, the number of spiral arms constituting the sub-cell is related to the overall shape of the sub-cell. The number of spiral arms constituting the sub-cell corresponds to the number of vertices of the overall shape of the sub-cell.

Referring to FIG. 6, the sub-cell has an overall rectangular shape, and thus is composed of four spiral arms. If the overall shape of the sub-cell is triangular, it is preferable that the sub-cell consists of three spiral arms.

Figure 7:
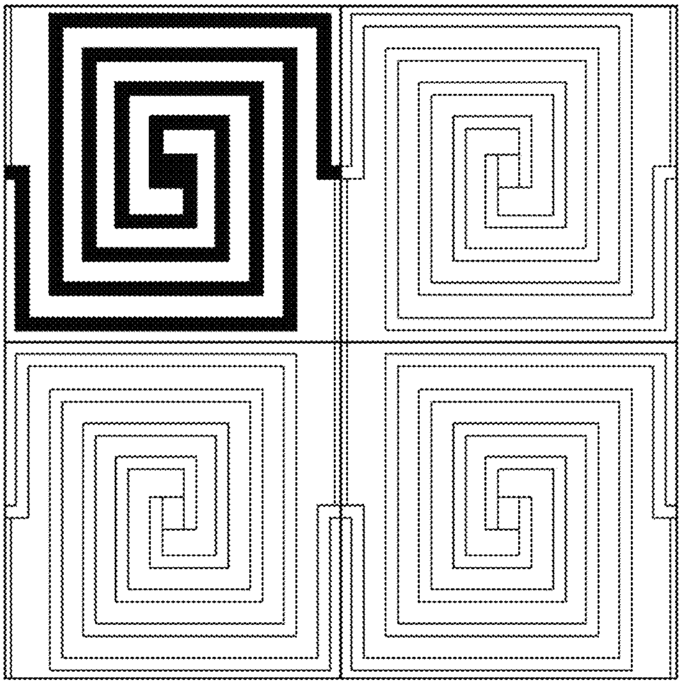
FIG. 7 is a diagram showing the structure when the overall shape of the sub-cell is square and the number of spiral arms is two.
Figure 8:
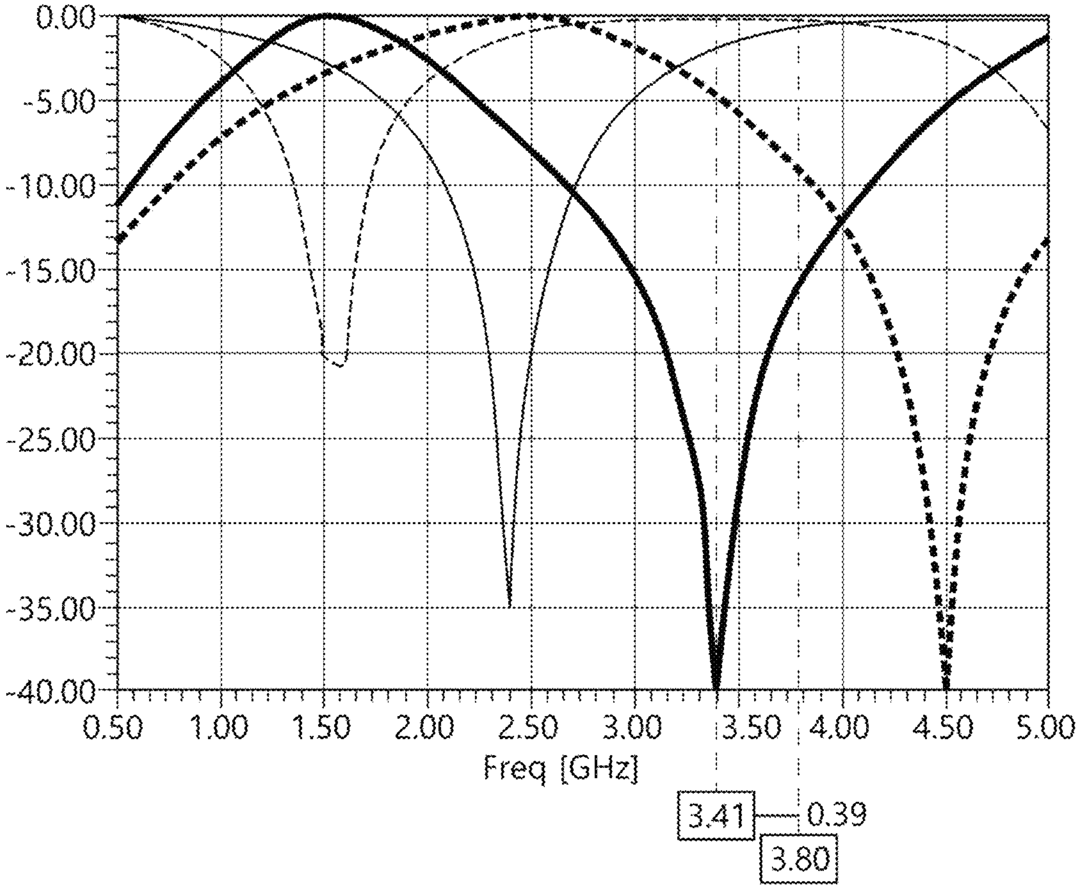
FIG. 8 is a graph showing the characteristics of the selective shielding surface when the sub-cell shown in FIG. 7 is used.

FIG. 7 is a diagram showing the structure when the overall shape of the sub-cell is square and the number of spiral arms is two, and FIG. 8 is a graph showing the characteristics of the selective shielding surface when the sub-cell shown in FIG. 7 is used.

Referring to FIG. 7, the overall shape of the sub-cell is a quadrangle, but the number of spiral arms is two. When only two spiral arms are formed as shown in FIG. 7, it is difficult to have uniform characteristics depending on the angle of the signal (beam) arriving at the selective shielding surface 400.

In FIG. 8, the red solid line is the S11 graph of the selective shielding surface when the angle of the arriving beam is 0 degrees, the red dotted line is the S11 graph of the selective shielding surface when the angle of the arriving beam is 60 degrees, the blue solid line is the S21 graph when the angle of the arriving beam is 0 degrees, and the blue dotted line is the S21 graph when the angle of the arriving beam is 60 degrees.

Referring to FIG. 8, it can be seen that the pass band of the selective shielding surface changes when the angle of the beam changes. When the angle of arrival of the beam is 0 degrees, the band with a center frequency of 1.5 GHz is the pass band, but when the angle of arrival of the beam is 60 degrees, the band with the center frequency of 2.5 GHz is the passband. Meanwhile, when the number of spiral arms is two, it can be seen that the loss also varies depending on the angle of arrival of the beam.

As seen in FIG. 8, when the number of spiral arms is two, uniform characteristics cannot be guaranteed depending on the angle of arrival of the beam, and even when the number of spiral arms is three, uniform characteristics cannot be guaranteed depending on the angle of arrival of the beam.

Figure 9:
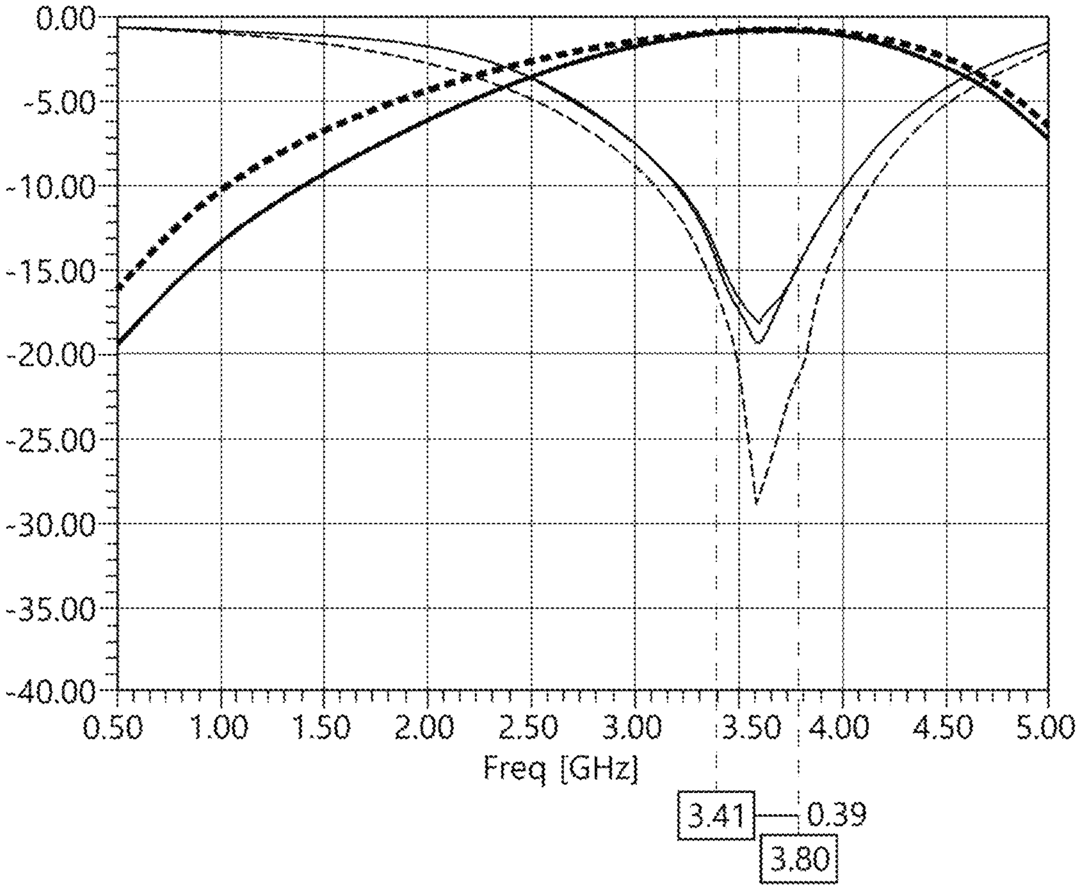
FIG. 9 is a graph showing the characteristics of the selective shielding surface when the number of spiral arms is four as shown in FIG. 5.

FIG. 9 is a graph showing the characteristics of the selective shielding surface when the number of spiral arms is four as shown in FIG. 5.

Also in FIG. 9, the red solid line is the S11 graph of the selective shielding surface when the angle of the arriving beam is 0 degrees, the red dotted line is the S11 graph of the selective shielding surface when the angle of the arriving beam is 60 degrees, the blue solid line is the S21 graph when the angle of the arriving beam is 0 degrees, and the blue dotted line is the S21 graph when the angle of the arriving beam is 60 degrees.

Referring to FIG. 9, it can be seen that when the number of spiral arms is four, the pass band remains the same depending on the angle of arrival of the beam. In addition, it can be seen that S21, which indicates loss, also remains the same.

Figure 10:
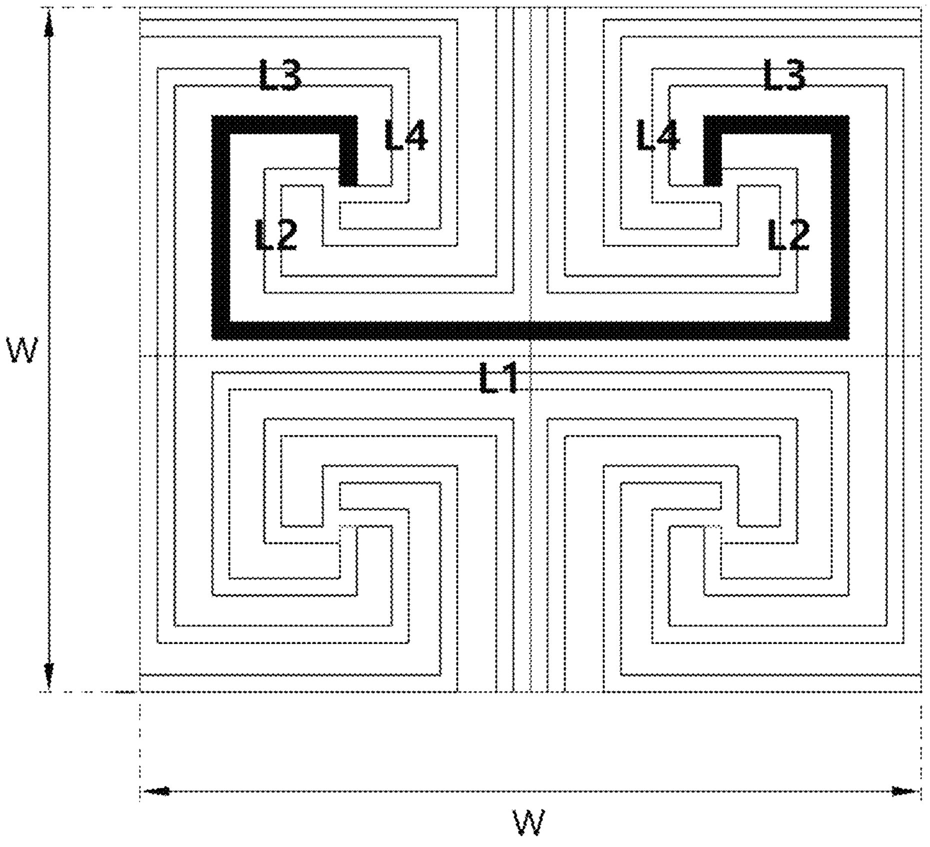
FIG. 10 is a diagram for explaining size constraints of unit cells constituting a selective shielding surface according to an embodiment of the present disclosure.

FIG. 10 is a diagram for explaining size constraints of unit cells constituting a selective shielding surface according to an embodiment of the present disclosure.

Referring to FIG. 10, W, the width of the unit cell, can be set to 0.132λ. In addition, the total length (L1+L2*2+L3*2+L4*2) of the spiral arms connected to each other can be set to 0.25λ. Meanwhile, the width of the spiral arm can be set to 0.002λ0 to 0.004λ, and the spacing between spiral arms can be set to 0.00λ% to 0.006λ.

It will be apparent to those skilled in the art that the size information described with reference to FIG. 10 may be illustrative and may vary depending on the environment in which the selective shielding surface 400 is installed and the frequency of use.

Figure 11:
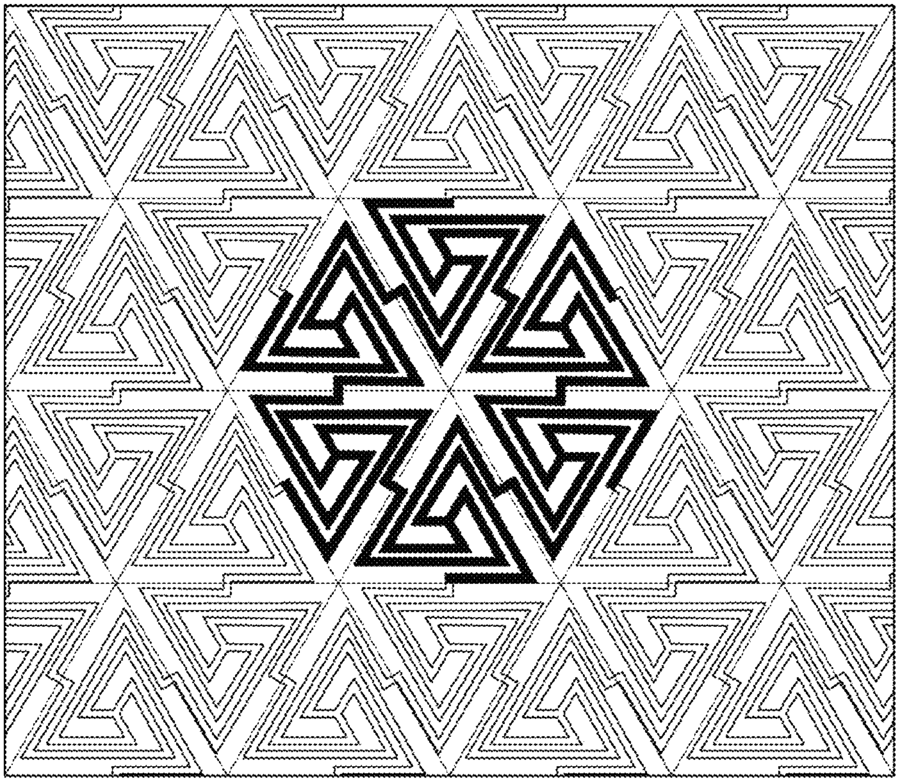
FIG. 11 is a diagram showing the structure of a selective shielding surface according to another embodiment of the present disclosure.

FIG. 11 is a diagram showing the structure of a selective shielding surface according to another embodiment of the present disclosure.

Referring to FIG. 11, a shielding surface on which hexagonal unit cells are repeatedly arranged is shown. The hexagonal unit cell consists of six sub-cells, and each sub-cell has an overall triangular shape. The spiral arms that make up each sub-cell are connected to the spiral arms of other adjacent sub-cells.

Since the overall shape of the sub-cell is triangular, the number of spiral arms that make up each sub-cell is three.

Figure 12:
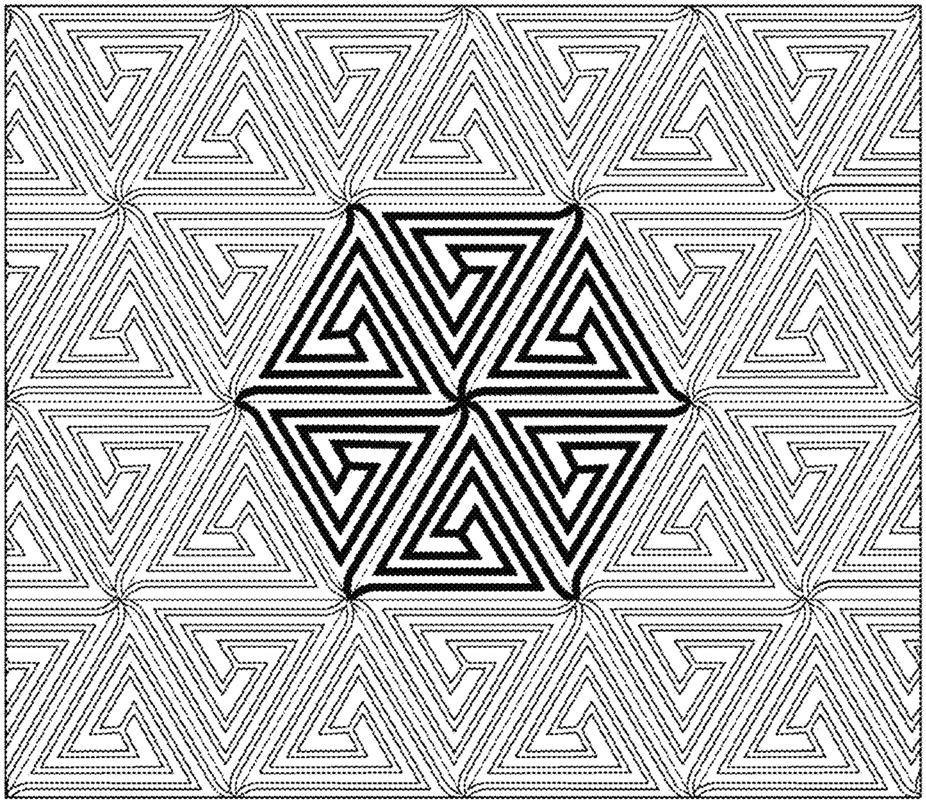
FIG. 12 is a diagram showing the structure of a selective shielding surface according to yet another embodiment of the present disclosure.

FIG. 12 is a diagram showing the structure of a selective shielding surface according to yet another embodiment of the present disclosure.

The selective shielding surface shown in FIG. 12 also has a structure in which hexagonal unit cells are repeatedly arranged, and each sub-cell constituting the unit cell has an overall triangular shape. Compared to FIG. 11, the shape of the spiral arm is different, but the number of spiral arms is the same.

Figure 13:
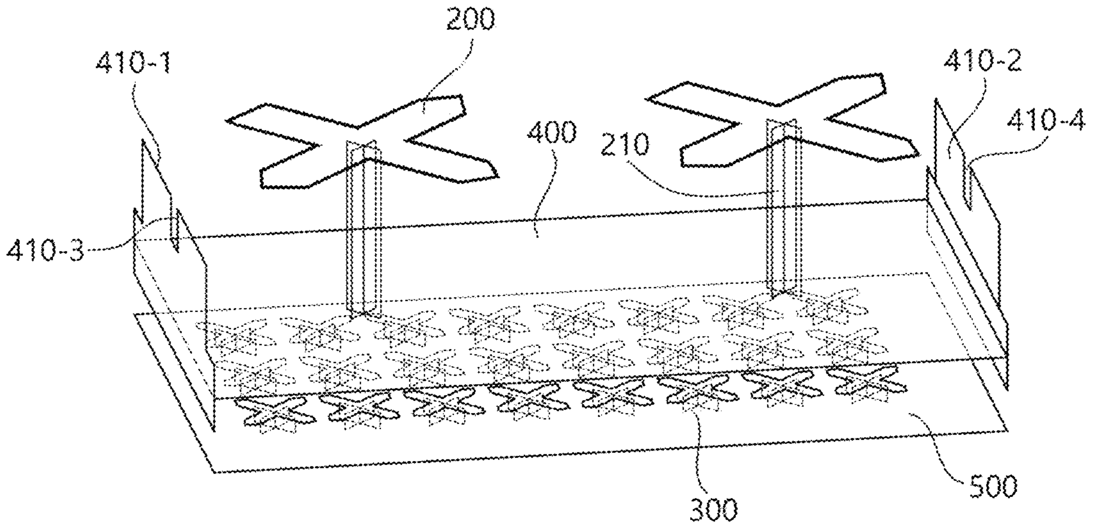
FIG. 13 is a perspective view of a multi-band base station antenna using a selective shielding surface according to another embodiment of the present disclosure.
Figure 14:
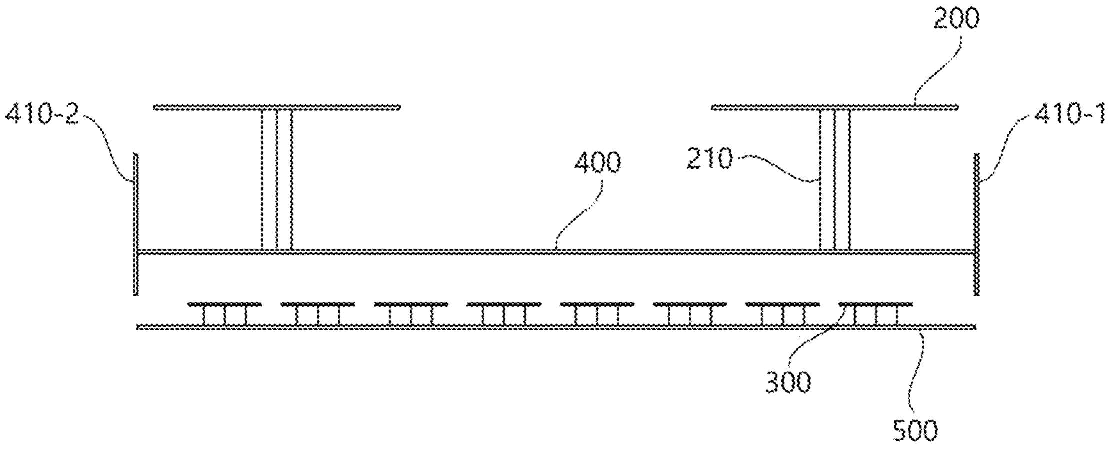
FIG. 14 is a cross-sectional view of a multi-band base station antenna using a selective shielding surface according to another embodiment of the present disclosure.

FIG. 13 is a perspective view of a multi-band base station antenna using a selective shielding surface according to another embodiment of the present disclosure, and FIG. 14 is a cross-sectional view of a multi-band base station antenna using a selective shielding surface according to another embodiment of the present disclosure.

In the embodiment shown in FIGS. 13 and 14, compared to the embodiment shown in FIGS. 2 and 3, vertical selective shielding surfaces 410-1 and 410-2 are coupled to both sides of the selective shielding surface 400. The vertical selective shielding surfaces 410-1 and 410-2 also operate to pass signals in a preset band and block signals outside the corresponding frequency band, and the vertical selective shielding surfaces 410-1 and 410-2 function as choke members for the low-band radiators 200. The choke member is formed perpendicular to the reflector and is used to improve isolation between radiators and control the beam width.

Since signals emitted from the low-band radiators 200 are reflected from the vertical selective shielding surfaces 410-1 and 410-2, it is possible for the vertical selective shielding surfaces 410-1 and 410-2 to function as choke members for the low-band radiators 200. Since signals emitted from the high-band radiator 300 pass through the vertical selective shielding surfaces 410-1 and 410-2, it does not affect the signals emitted from the high-band radiators 300. In addition, slots 410-3 and 410-4 are formed on the vertical selective shielding surface to improve the front-to-back ratio of the low-band radiators 200.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A multi-band base station antenna using a selective shielding surface, the multi-band base station antenna comprising:

- a selective shielding surface which passes signals in a preset frequency band;
- a plurality of low-band radiators located on the selective shielding surface;
- a reflection plate disposed below the selective shielding surface and spaced apart from the selective shielding surface;
- a plurality of high-band radiators coupled onto the reflection plate,
- wherein the selective shielding surface has a pass band configured to pass signals emitted from the plurality of high-band radiators and block signals emitted from the plurality of low-band radiators,
- wherein the selective shielding surface has a structure in which unit cells are repeatedly arranged, and each unit cell includes a plurality of sub-cells,
- wherein each of the plurality of sub-cells includes a plurality of spiral arms having a structure that extends from a central point and is bent multiple times,
- wherein the number of the spiral arms in each of the plurality of sub-cells corresponds to the number of vertices of a polygon corresponding to an overall shape of each of the plurality of sub-cells.

2. The multi-band base station antenna using a selective shielding surface according to claim 1,

- wherein a spiral arm of a specific sub-cell is connected to a spiral arm of another adjacent sub-cell.

3. The multi-band base station antenna using a selective shielding surface according to claim 1,

- wherein vertical selective shielding surfaces perpendicular to the selective shielding surface are coupled to both sides of the selective shielding surface, and the vertical selective shielding surfaces have a pass band configured to pass the signals emitted from the plurality of high-band radiators and block the signals emitted from the plurality of low-band radiators.

4. A multi-band base station antenna using a selective shielding surface, the multi-band base station antenna comprising:

a selective shielding surface which passes signals in a preset frequency band; and a plurality of first radiators located on top of the selective shielding surface, wherein the selective shielding surface has a pass band configured to block signals of the plurality of first radiators, wherein the selective shielding surface has a structure in which unit cells are repeatedly arranged, and each unit cell includes a plurality of sub-cells, wherein each of the plurality of sub-cells includes a plurality of spiral arms having a structure that extends from a central point and is bent multiple times, and wherein the number of the spiral arms in each of the plurality of sub-cells corresponds to the number of vertices of a polygon corresponding to an overall shape of each of the plurality of sub-cells.

5. The multi-band base station antenna according to claim 4, wherein the multi-band base station antenna further comprises a plurality of second radiators located below the selective shielding surface.

6. The multi-band base station antenna according to claim 5, wherein the selective shielding surface has a pass band configured to pass signals emitted from the plurality of second radiators.

7. The multi-band base station antenna according to claim 4, wherein a spiral arm of a specific sub-cell is connected to a spiral arm of another adjacent sub-cell.

8. The multi-band base station antenna according to claim 6, wherein vertical selective shielding surfaces perpendicular to the selective shielding surface are coupled to both sides of the selective shielding surface, and the vertical selective shielding surfaces have a pass band configured to pass the signals emitted from the plurality of second radiators and block the signals emitted from the plurality of first radiators.

9. The multi-band base station antenna according to claim 8, wherein a slot is formed in the vertical selective shielding surfaces.

* * * * *